United States Patent [19]

Kobayashi

[11] Patent Number: 5,184,216
[45] Date of Patent: Feb. 2, 1993

[54] IMAGE SENSING APPARATUS HAVING CAMERA-SHAKE DETECTION FUNCTION

[75] Inventor: Akio Kobayashi, Hirakata, Japan

[73] Assignee: Sanyo Electric Co., Ltd., Osaka, Japan

[21] Appl. No.: 677,188

[22] Filed: Mar. 29, 1991

[30] Foreign Application Priority Data

Mar. 30, 1990 [JP] Japan ................................. 2-85304
May 29, 1990 [JP] Japan ................................. 2-141144
Jun. 22, 1990 [JP] Japan ................................. 2-164801

[51] Int. Cl.⁵ ........................................... H04N 5/225
[52] U.S. Cl. ................................... 358/105; 358/222
[58] Field of Search .............................. 358/105, 222

[56] References Cited

U.S. PATENT DOCUMENTS 5,099,323 3/1992 Morimura ......................... 358/222
5,107,293 4/1992 Sekine ............................... 358/222

Primary Examiner—Howard W. Britton
Attorney, Agent, or Firm—Armstrong, Westerman, Hattori, McLeland & Naughton

[57] ABSTRACT

A video camera having camera-shake detection function divides an image sensed picture into a plurality of blocks and binary codes the luminance signal in each pixel in each block. The presence of a binary coded data of "1" is detected for each horizontal line and vertical line in each block, whereby the presence of at least one causes data "1" to be stored in the bit position in the memory corresponding to the line. Accordingly, data representing the distribution of an object in the vertical direction and the horizontal direction are obtained for each block. By calculating the data correlation between consecutive frames, a motion vector of the object for each block is specified, whereby a motion vector representing the entire picture is selected by subjecting the motion vectors of all blocks is selected by subjecting the motion vectors of all blocks to majority decision logic process. In accordance with this selected motion vector, the movement of the object caused by the camera-shake is corrected appropriately.

6 Claims, 8 Drawing Sheets

IMAGE SENSING APPARATUS HAVING CAMERA-SHAKE DETECTION FUNCTION

BACKGROUND OF THE INVENTION

1. Field of the Invention

The present invention relates to image sensing apparatus such as video camera having camera-shake detection function, and more particularly, to an image sensing apparatus that can detect the direction and magnitude of camera-shake according to variation with time of the distribution state of high luminance area in an image sensed picture.

2. Description of the Background Art

Image sensing apparatus are in practical use that detect the direction and magnitude of camera-shake to correct unnecessary motion in the image sensed picture caused by camera-shaking in shooting continuously an object using an image sensing apparatus such as a video camera. Japanese Patent Laying-Open No. 60-143330 discloses a video camera comprising a vibration type angle velocity sensor that obtains electrically the amount of camera-shaking of a video camera by detecting Corioli's force with the sensor, for example.

There is another method of detecting camera-shake that sets a number of sampling points in advance in an image sensed picture for detecting and holding the luminance signal level of each sampling point in a field, followed by detecting the luminance signal level of the peripheral area of each sampling point in the succeeding field, and comparing this with the luminance signal level of the prior field in the corresponding sampling point for specifying the motion vector of the image sensed picture. In other words, by searching for a point in the periphery area having a luminance level equal to that of the corresponding sampling point in the prior field to calculate the direction and distance of the level change from that sampling point as a center point, the motion vector of the object image is specified for each sampling point. Then, by specifying the most frequent occurring direction and distance motion vector out of the many motion vectors in the entire image sensed picture as the motion vector representing the motion of the entire image sensed picture, the motion of the image sensed picture is corrected in accordance with the determined motion vector.

Such methods of camera-shake correction comprise the method of moving the lens or image sensing device (for example, a solid-state image sensing device such as CCD) of the image sensing apparatus in accordance with the detected camera-shake information (motion vector), and the method of moving an area (effective image area) corresponding to a signal read out area from the image sensing device within an area (image sensing area) corresponding to the entire image sensing device, which are both well-known conventional techniques (for example, refer to Japanese Patent Publication No. 1-212078).

The above mentioned methods of camera-shake detection require the provision of a special sensor or a memory of large capacity, which gave a disadvantage that these methods are not so suitable for video cameras for consumer use.

SUMMARY OF THE INVENTION o An object of the present invention is to provide an image sensing apparatus that can detect camera-shake with a simple structure.

Another object of the present invention is to provide an image sensing apparatus that can detect camera-shake accurately even when binary coded data of the luminance level of an object are dispersed.

Briefly stated, an image sensing apparatus having camera-shake detection function according to the present invention includes an image sensing device, a binary coding circuit, a distribution data calculating circuit, a motion vector specifying circuit, and a motion vector selection circuit. The image sensing device converts light from an object into a video signal. The binary coding circuit divides the image sensed picture into a plurality of blocks for comparing the video signal at the plurality of sampling points in each block with a first reference value determined for each block to produce binary coded data. The distribution data calculating circuit calculates data representing the distribution position in the vertical and horizontal directions of the object in each block in accordance with the binary coded data for each block. The motion vector specifying circuit specifies the motion vector of the object for each block according to the data representing the distribution position of the object. The motion vector selection circuit selects the motion vector of the object of the entire image sensed picture according to majority decision logic processing based on the motion vectors specified for respective blocks.

According to another aspect of the present invention, the distribution data calculating circuit detects the presence of a specific binary coded data in each horizontal line of each block to generate a first data indicating the distribution position of an object in the vertical direction, and detects the presence of a specific binary coded data in each vertical line in each block to generate a second data indicating the distribution position of the object in the horizontal direction.

According to a further aspect of the present invention, a distribution data calculating circuit integrates binary coded data in each horizontal line in each block to generate a first normalized data by comparing the result with a second reference value determined for each block, and integrates binary coded data in each vertical line in each block to generate a second normalized data by comparing the result with a third reference value determined for each block.

According to a still further aspect of the present invention, a distribution data calculating circuit calculates data indicating the center point of an object in each block according to first and second normalized data.

The major advantage of the present invention is that the motion of an object due to camera-shake can be detected without providing a special sensor or a memory of large capacity, due to implementation of dividing an image sensed picture into a plurality of blocks to specify a motion vector of the object for each block.

Another advantage of the present invention is that the motion of an object in an image sensed picture can be detected accurately owing to normalization process of compressing the pattern of the object and binary coding the same, even if binary coded data of the luminance level of the object image are dispersed.

Further advantage of the present invention is that the circuit structure for detecting the motion of an object can be further simplified due to implementation of specifying a motion vector for each block based on data indicating the center point of the object in each block.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
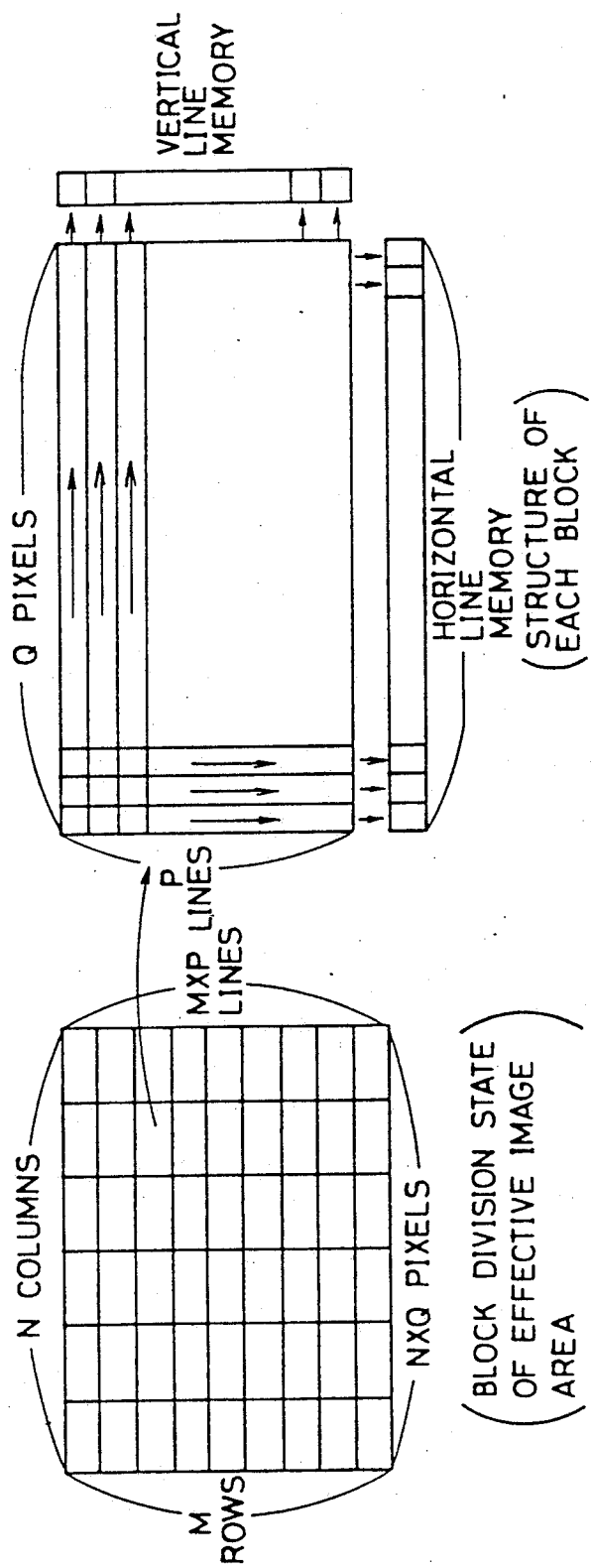
FIGS. 1A and 1B schematically show a manner in which an image area is divided into a plurality of blocks 1 according to the present invention.

FIGS. 1A and 1B schematically show a manner in which an image area is divided into a plurality of blocks. The principle of block division of the present invention will be explained hereinafter with reference to FIGS. 1A and 1B.

FIG. 1A shows a signal read out area from a CCD which is a solid-state image sensing device, i.e. the entire effective image area. This area is formed by a certain number of effective image lines (horizontal lines including image information; 480 horizontal lines in this case), where each of these effective image lines is formed of a certain number of pixels (picture elements; 900 pixels in this case). According to the present invention, this effective image area is divided into N columns in the vertical direction and M rows in the horizontal direction to result in M×N blocks, as shown in FIG. 1A.

FIG. 1B is an enlarged view of one of the M×N blocks of FIG. 1A. In each block, it is presumed that there are P effective image lines, each formed of Q pixels. In other words, the entire effective image area of FIG. 1A is formed of M×P=480 effective image lines, where each effective image line is formed of N×Q=900 pixels.

The basic principle of the present invention will be described briefly. The division of effective image area is carried out for the purpose of specifying a motion vector of an object for each block. That is to say, the video (luminance) signal level of each pixel (picture element) in each block is compared with a reference value determined for each block, whereby a binary coded data of a high level (1) or a low level (0) indicating the image of the object is obtained for each pixel. The motion vector of the object for each block can be specified by comparing data indicating the distribution state of high level data obtained for each block by each frame. Then, a motion vector of the object of the entire picture can be specified by majority decision logic process based on the motion vectors of respective blocks.

Figure 2:
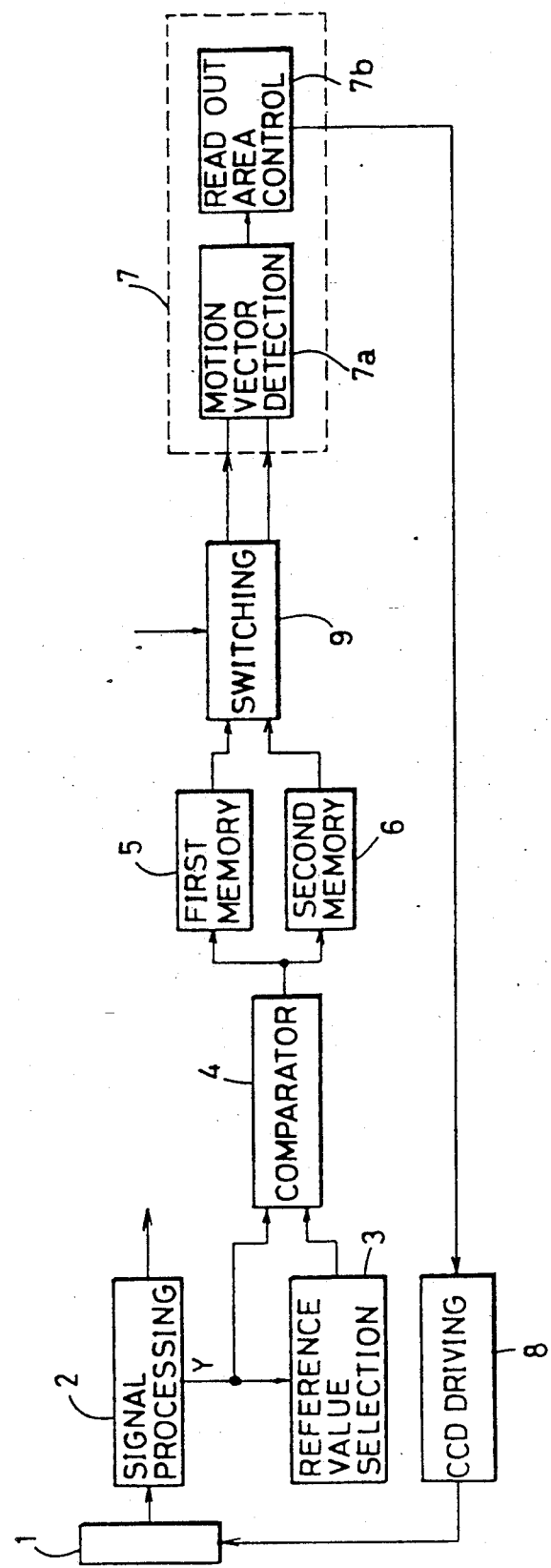
FIG. 2 is a block diagram schematically showing a camera-shake detecting circuit of a video camera according to a first embodiment of the present invention.

FIG. 2 is a block diagram schematically showing a camera-shake detecting circuit of a video camera according to a first embodiment of the present invention. The operation of the first embodiment indicated in FIG. 2 is described with reference to the aforementioned FIGS. 1A and 1B.

According to the first embodiment of the present invention, each block formed of P×Q pixels, as shown in FIG. 1B, is further divided into P horizontal lines and Q vertical lines. For each horizontal line, determination is made whether there is a pixel having a data of a high logic level, whereby the presence of at least one pixel having a high level data in the corresponding horizontal line causes a data of "1" to be stored in the corresponding bit position in a vertical line memory of a P-bit structure that will be described later on. Similarly, for each vertical line, determination is made whether there is a pixel having a high level data, whereby the presence of at least one pixel having a high level data in the corresponding vertical line causes a data of "1" to be stored in the corresponding bit position in a horizontal line memory of a Q-bit structure that will also be explained later on.

This detection of the distribution state of high level data in each of M×N blocks is carried out for each frame. The detected results of all the blocks in the preceding frame are temporarily held and compared with the detected results of all the blocks of a succeeding frame during a vertical blanking period to obtain correlation of data between frames in each of the vertical direction and the horizontal direction. The moving distances in the vertical direction and the horizontal direction of the distribution state of high level data are obtained for each block to specify the motion vector of the object in the corresponding block. Then, the motion vector of the entire picture is determined by logic processing such as majority decision logic processing based on the motion vectors determined for respective blocks.

According to the above mentioned first embodiment, the capacity required for the vertical line memory and the horizontal line memory for the entire effective image area is P×(M×N)=480N bits and Q×(M×N)=900M bits, respectively, which results in 480N+900M bits in total. In comparison with the memory capacity of 480×900=432K bits necessary for sampling binary coded data for all pixels in the entire picture, a memory of significantly smaller capacity is sufficient for determining the motion vector of the object.

The specific operation of the camera-shake detecting circuit according to the first embodiment of the present invention will be explained hereinafter with reference to FIG. 2. The first embodiment shows the case where the present invention is applied to a video camera which performs camera-shake correction by moving the effective image area within the image sensed area corresponding to the entire CCD according to the detected camera-shake information. Because such camera-shake correction is a well-known conventional technique, specific description of means for camera-shake correction is omitted.

Referring to FIG. 2, the image sensed output provided from a solid-state image sensing device 1 such as a CCD is supplied to a signal processing circuit 2 to be converted into a color video signal of a NTSC system. Signal processing circuit 2 separates a luminance signal from the NTSC color video signal and provides the same to a reference signal selection circuit 3 and a comparison circuit 4.

Reference value selection circuit 3 determines an intermediate value between a peak value of the luminance signal of the preceding frame within each of the M×N blocks and a pedestal level which is a fixed DC voltage level, as the reference value for each block.

Comparison circuit 4 compares the current luminance signal supplied continuously from signal processing circuit 2 with a reference value determined as mentioned above for each block according to a predetermined sampling cycle provide a binary coded data representing a high level (1) when the luminance signal exceeds the reference value and otherwise a low level (0).

The output of comparison circuit 4 is stored in a first memory circuit 5 during the effective image period of a certain frame, and stored in a second memory circuit 6 during the effective image period of the next frame. In a further next frame, the comparison output is stored again in the first memory circuit 5. In a similar manner, the comparison results are stored alternately in memory circuits 5 and 6 by every frame.

Figure 3:
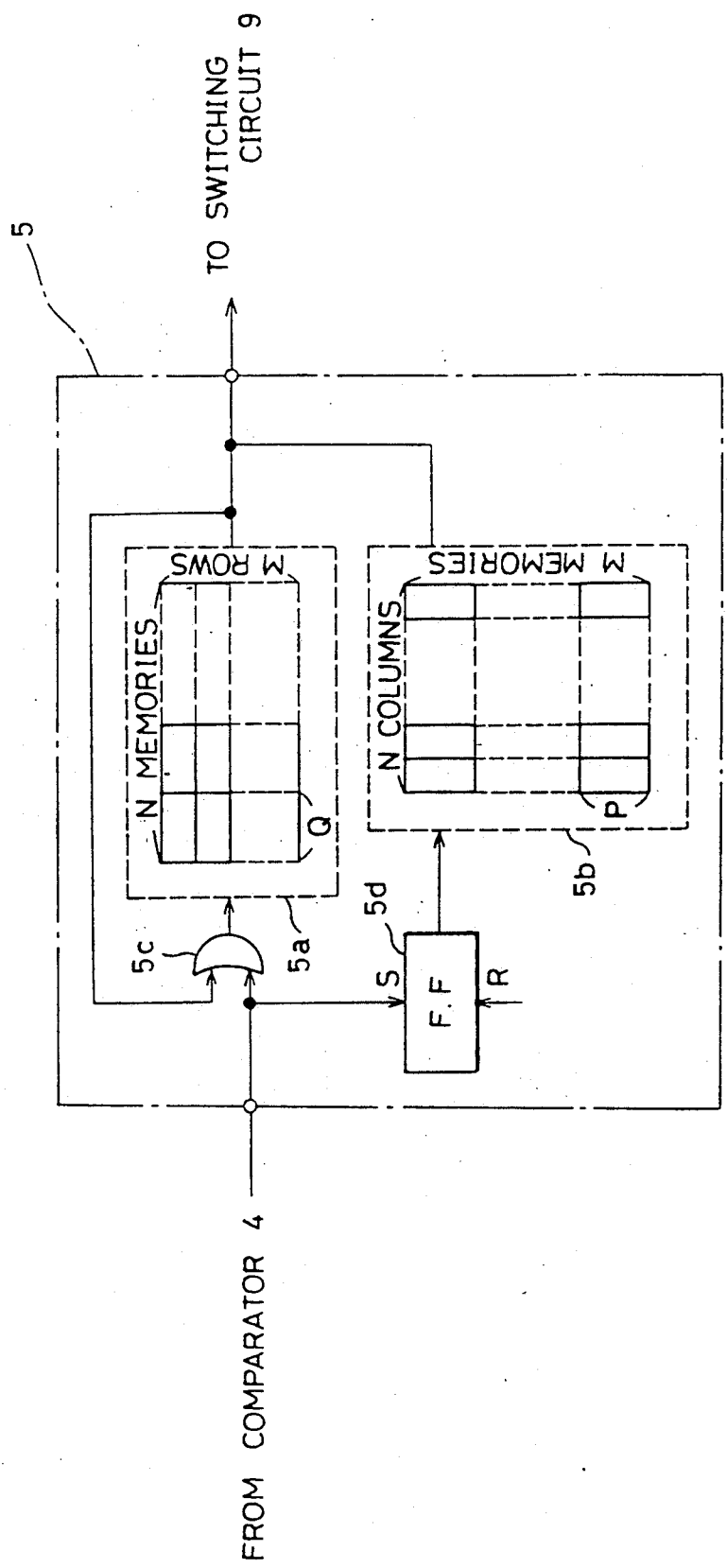
FIG. 3 is a block diagram showing in detail a memory circuit of FIG. 2.

FIG. 3 is a block diagram showing the structure of the first memory circuit 5. The structure of the second memory circuit 6 is identical to that of memory circuit 5, and their description will not be repeated. Referring to FIG. 3, a binary coded data of a high level or a low level from comparison circuit 4 is applied to one input of an OR circuit 5c and to the set input of a flip-flop circuit 5d.

The output of OR circuit 5c is provided and stored in a horizontal line memory 5a. Horizontal line memory 5a is considered as the horizontal line memory of a Q-bit structure for each block indicated at the bottom of FIG. 1B, which is gathered a number corresponding to the entire picture, i.e. M×N horizontal line memories. In other words, each of M×N blocks formed by dividing the horizontal line memory 5a of FIG. 3 corresponds to the horizontal line memory of Q bits for each block of FIG. 1B.

N memories of the topmost row of horizontal line memory 5a are supplied with and stores the binary coded data of N×Q pixels forming the first effective image line via OR circuit 5c. Next, when the binary coded data of the second effective image line is applied to one input of OR gate 5c, the data of a pixel (address) corresponding to that of a newly input data, out of the above written data, is read out from memory 5a in synchronism with the horizontal synchronizing signal component in the luminance signal, and supplied simultaneously to the other input of OR gate 5c. If at least one of the two inputs of OR gate circuit 5c is a high level data, a high level data is written into the corresponding address of horizontal line memory 5a. Otherwise, a low level data is written into the corresponding address. This OR process is carried out for each pixel (address) for the first through Pth effective image lines. If there is at least one binary coded data of a high level in each of the Q vertical lines for each of the N blocks of the uppermost row in the effective image area, the data of the corresponding pixel (address) eventually attains a high level, and if there is no binary coded data of a high level, the data of the corresponding pixel (address) attains a low level. Such distribution detected data indicating the presence of a high level data in each vertical line are first stored in the uppermost row blocks in horizontal line memory 5a of FIG. 3.

Similar OR process is carried out for data of the next P effective image lines, whereby distribution detected data indicating the presence of a binary coded data of a high level for each vertical line for the N blocks of the second row of the effective image area are stored in the blocks of the second row of horizontal line memory 5a of FIG. 3. Similar processing is carried out for every P effective image lines, whereby distribution detected data corresponding to one frame is stored in horizontal line memory 5a.

Flip-flop circuit 5d is reset at a timing corresponding to the start of every N blocks by a reset signal provided from a reset signal generating circuit (not shown), and set when the binary coded data from comparison circuit 4 is a high level in each horizontal period. If there is at least one pixel of a high level data in each section of the effective image line divided into N portions, a high level distribution detected data is stored only in the address indicating the corresponding horizontal line in the corresponding block of the N×M blocks forming the vertical line memory 5b of FIG. 3.

In the above described manner, distribution detected data indicating the distribution state of pixels of high level for consecutive two frames are stored in the first and second memory circuits 5 and 6, whereby data is read out at a high rate simultaneously from both memory circuits during the vertical blanking period. In other words, data are read out simultaneously from the horizontal line memories 5a and 6a from respective memory circuits, and then data are read out simultaneously from the vertical line memories 5b and 6b. The distribution detected data read out from memory circuits 5 and 6 are supplied to the two input terminals of a microcomputer 7 via a switching circuit 9 that is switching controlled by each frame with a control signal from a control signal source not shown.

Microcomputer 7 specifies the object's motion vector of the entire effective image area according to the distribution detected data read out from the first and second memory circuits 5 and 6, whereby the effective image area is appropriately moved within the image sensed area in a software manner. Microcomputer 7 is functionally represented as a combination of motion vector detecting circuit 7a and a read out area control circuit 7b.

Figure 4:
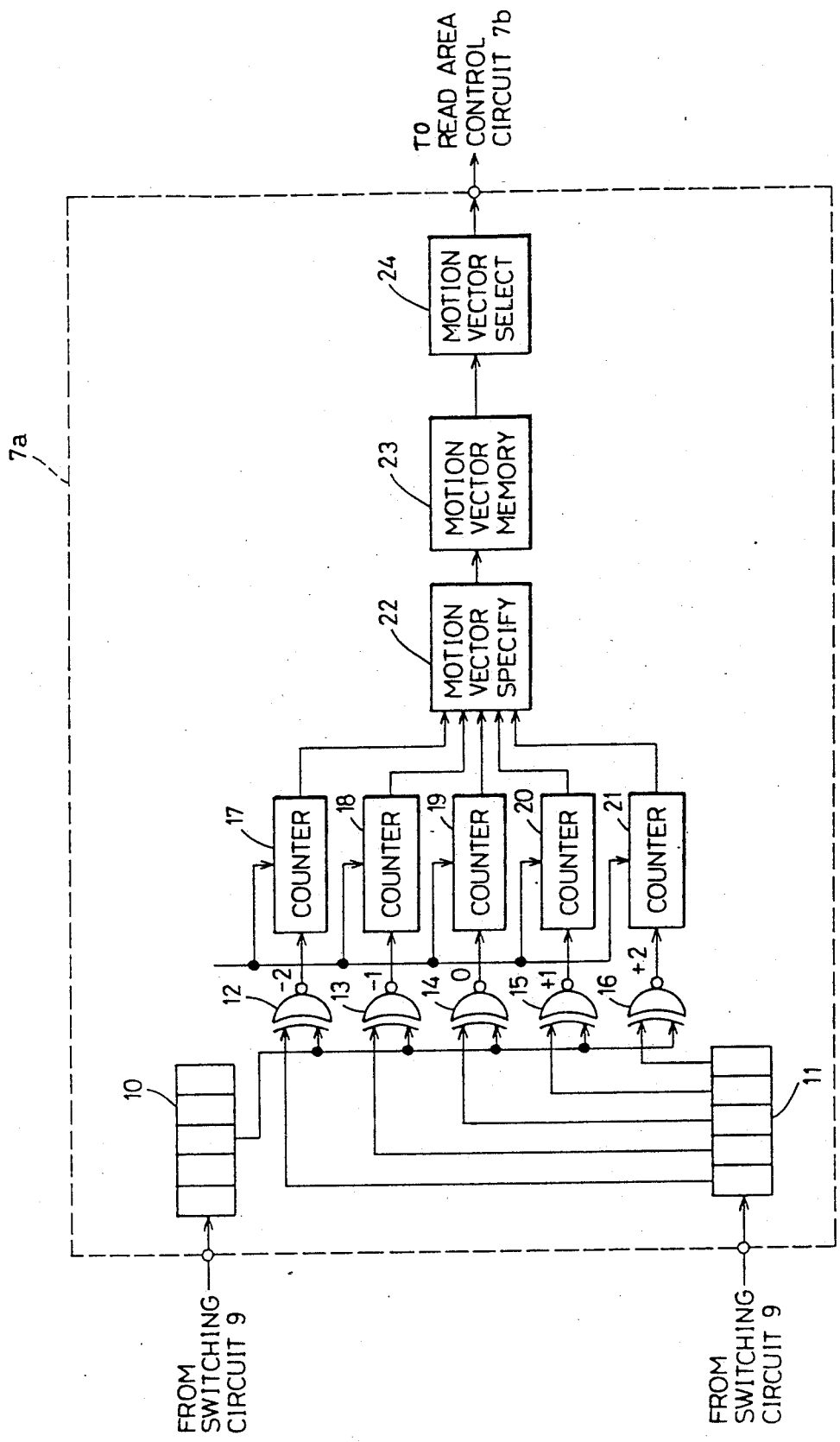
FIG. 4 is a block diagram showing in detail a motion vector detecting circuit of FIG. 2.

FIG. 4 is a block diagram showing the function of motion vector detecting circuit 7a. Referring to FIG. 4, switching circuit 9 (FIG. 2) switches between the data paths of two systems by every frame so that always the data of the latest frame out of the distribution detected data of the two consecutive frames stored in the first and second memory circuits 5 and 6 are applied in series to a shift register 10 of 5 bits, and always data of the preceding frame are applied in series to a shift register 11 of 5 bits.

The data of the third bit from the head of the data of five bits of the latest frame applied to the first shift register 10 is supplied commonly to respective one inputs of negative exclusive OR circuits 12-16. The data of five bits of the preceding frame applied to the second shift register 10 are respectively applied to the other inputs of negative exclusive OR circuits 12-16. Each negative exclusive OR circuit generates a high level data only when the two inputs coincide with each other, and otherwise a low level data. This generated data is supplied to the corresponding counter of counters 17-21 of the succeeding stage. Each of counters 17-21 counts the output of the corresponding negative exclusive OR circuit for each block section according to a timing signal applied commonly from a signal generating source not shown.

In other words, the output of the center negative exclusive OR circuit 14 indicates the match/mismatch of the distribution detected data of the same address of the first and second memory circuits 5 and 6, whereby the output thereof, i.e. the counted value of counter 19 which counts the number of matching, indicates the degree of correlation with respect to the possibility of no movement in the object between consecutive frames for each block.

The outputs of negative exclusive OR circuits 13 and 15 indicate the match/mismatch of distribution detected data in addresses differing by ±1 bit from each other of the first and second memory circuits 5 and 6, whereby the counted values of counters 18 and 20 counting the number of matching indicate the degree of correlation with respect to the possibility of ±1 pixel or ±1 horizontal line movement of the object in the horizontal direction or the vertical direction between consecutive frames for each block.

The outputs of negative exclusive OR circuits 12 and 16 indicate the match/mismatch of distribution detected data of addresses differing by ±2 bits from each other of the first and second memory circuits 5 and 6, whereby the counted values of counters 17 and 21 counting the number of matching indicate the degree of correlation with respect to the possibility of ±2 pixels or ±2 horizontal lines movement of the object in the horizontal direction or the vertical direction between consecutive frames for each block.

Motion vector specifying circuit 22 obtains the moving distances of the object in the horizontal and vertical directions for each block by specifying the counter having the maximum counted value out of counters 17-21 every time the counting for each block is completed, and stores subsequently the results in motion vector memory 23. The motion vectors for respective blocks are thus formed in motion vector memory 23.

The motion vectors of respective blocks established in memory 23 are subsequently read out and provided to motion vector selection circuit 24 for majority decision logic processing. Motion vector selection circuit 24 selects the most reasonable motion vector from the motion vectors of respective blocks and provides the same as the motion vector representing the motion of the object in the entire picture to read out area control circuit 7b of FIG. 2. Motion vector selection circuit 24 capable of the aforementioned majority decision logic process is well known, and detail description will be omitted.

Read out area control circuit 7b generates a control signal and provides it to a CCD driving circuit 8 for moving the effective image area within the image sensed area to follow the provided motion vector of the entire picture. CCD driving circuit 8 responds to this control signal to generate a signal for changing the signal read out area within the entire image sensed area of CCD 1. This signal is provided to CCD 1. As a result, the effective image area is moved following the movement of the object within the effective image area.

Although the moving distances of the object in the consecutive frames are ±2 pixels in the horizontal direction and ±2 horizontal lines in the vertical direction in the above first embodiment, the moving distances are not limited to the above example and may be increased if necessary.

Thus, according to the first embodiment of the present invention, the unnecessary movement of an object in an effective image area due to camera-shaking caused by the operator of a video camera can be detected without using a special sensor or a memory of large capacity to correct such unnecessary movement.

If high luminance portions of the object image are dispersed in each of the N×M blocks obtained by dividing the effective image area in the above mentioned first embodiment, it is difficult to detect the movement of the object in each block according to the correlation of binary coded data (distribution detected data) between consecutive frames, since all contents in the horizontal and vertical line memories become "1".

In a second embodiment of the present invention which will be explained hereinafter performs normalization processing by integrating high level portions of the pattern of an object image in each block and binary coding the integrated value by comparing the same with a reference value. Trivial information of the object image are removed and the patterns of the object image are simplified by the normalization process. This ensures appropriate detection of the movement of the object.

Figure 5:
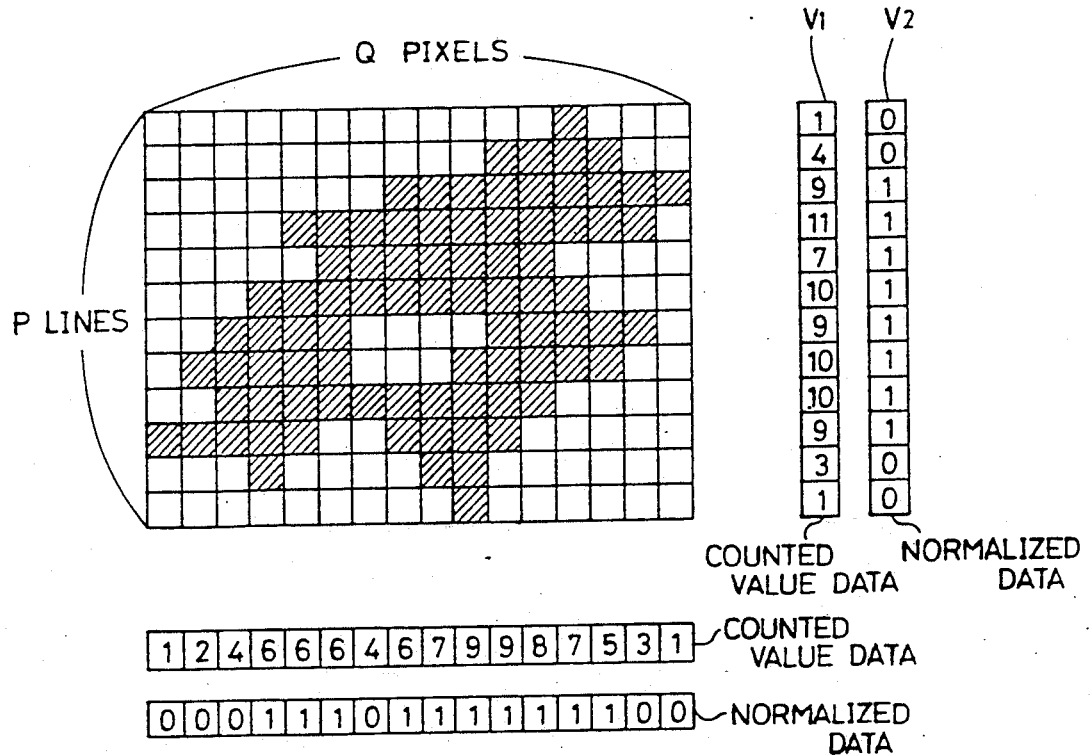
FIG. 5 is a diagram schematically showing the principle of normalization according to a second embodiment of the present invention.

FIG. 5 is the diagram used for explaining the principle of normalization according to the second embodiment. Referring to FIG. 5, one of the M×N blocks of FIG. 1A is enlarged and shown. This block is further divided into M×Q pixels, similar to FIG. 1B. According to the normalization process, the binary coded data of high level (the shaded portions in FIG. 5) are integrated in the vertical direction and the horizontal direction for each block. In other words, the number of binary coded data of a high level is counted for each of the P horizontal lines, whereby the vertical counted data is provided for P horizontal lines (refer to $V_1$ of FIG. 5). Also, the number of binary coded data of a high level are counted for each of the Q vertical lines, whereby the horizontal counted data is provided for Q pixels (refer to $H_1$ of FIG. 5).

Then, an intermediate value of the counted data is calculated for each block in each of the horizontal direction and the vertical direction. In FIG. 5, the minimum counted value in data $V_1$ is 1 and the maximum counted value is 11 to result in the intermediate value of $(1+11)/2=6$ for the vertical direction. The minimum counted value of data $H_1$ is 1 and the maximum counted value is 9 to result in an intermediate value of $(1+9)/2=5$ for the horizontal direction.

Based on these intermediate values of the preceding frame formed in the above described manner, the counted values of the current frame are binary coded to form normalized data. If the intermediate values of the preceding frame are similarly 6 in the vertical direction and 5 in the horizontal direction in the example of FIG. 5, the normalized data of the horizontal line where the counted value exceeds 6 is set to "1", and the normalized data of the horizontal line that is less than 6 is set to "0". (Refer to $V_2$ of FIG. 5). For the horizontal direction, the normalized data of the vertical line where the counted value exceeds 5 is set to "1", and the normalized data of the vertical line where the counted value is less than 5 is set to "0" (refer to $H_2$ of FIG. 5). These normalized data $V_2$ and $H_2$ are stored in the vertical line memory and the horizontal line memory instead of the distribution detected data of the aforementioned first embodiment, whereby the motion vector of the object for each block is specified according to these normalized data, similar to the manner in the first embodiment.

Figure 6:
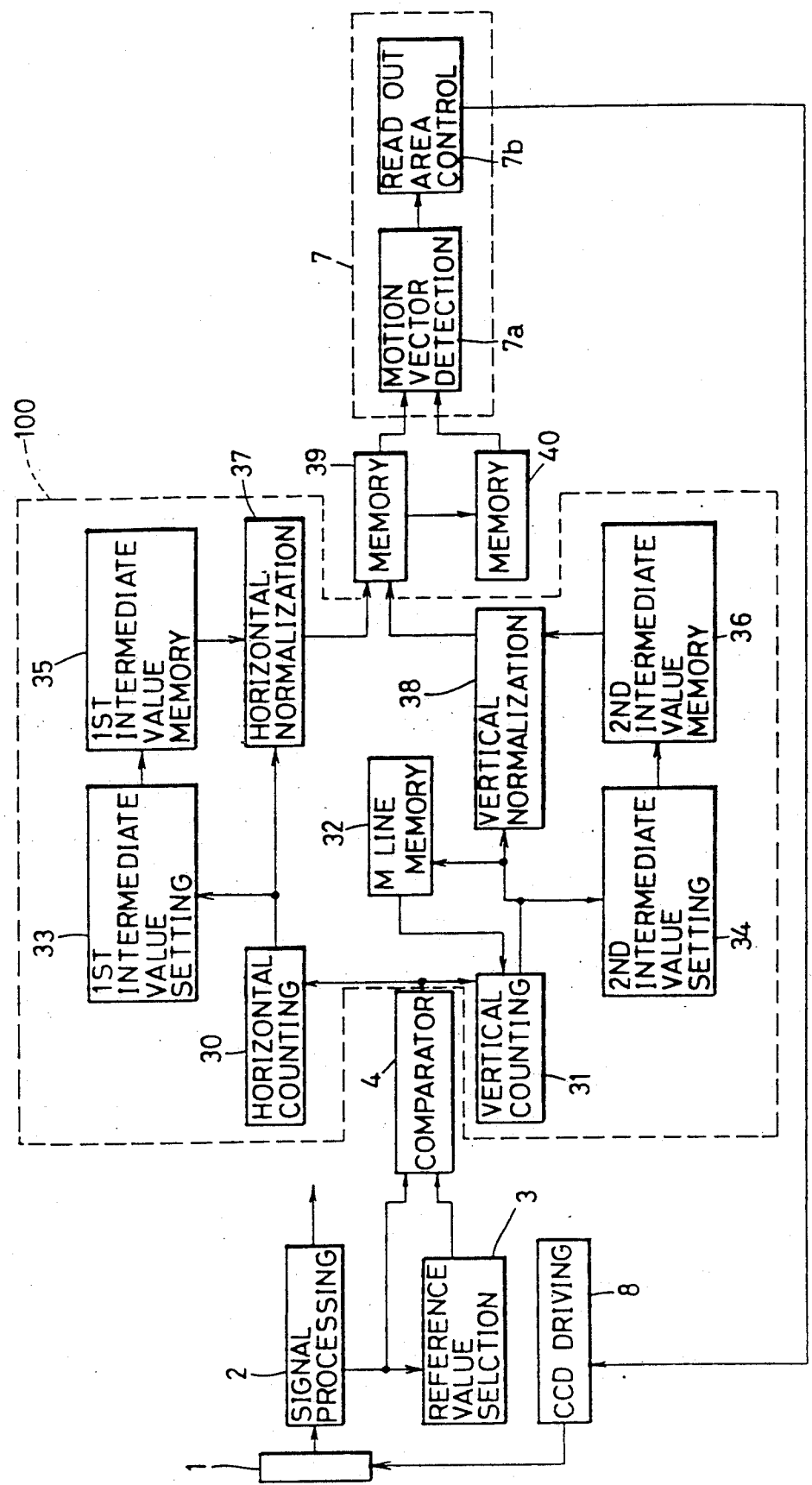
FIG. 6 is a block diagram schematically showing a camera-shake detecting circuit of a video camera according to the second embodiment of the present invention.

FIG. 6 is a block diagram schematically showing a camera-shake detecting circuit of a video camera according to the second embodiment. In FIG. 6, solid-state image sensing device 1, signal processing circuit 2, reference value selection circuit 3, comparison circuit 4, motion vector detecting circuit 7a, read out area control circuit 7b and CCD driving circuit 8 are identical to those shown in FIG. 2, and their descriptions will not be repeated.

Referring to FIG. 6, the binary coded data for each pixel supplied from comparison circuit 4 is applied to a horizontal counting circuit 30 and a vertical counting circuit 31. Horizontal counting circuit 30 counts the supplied binary coded data for each block and for each horizontal line to provide the resulting data $V_1$ to a first intermediate value setting circuit 33 and to a horizontal normalization circuit 37.

Figure 7:
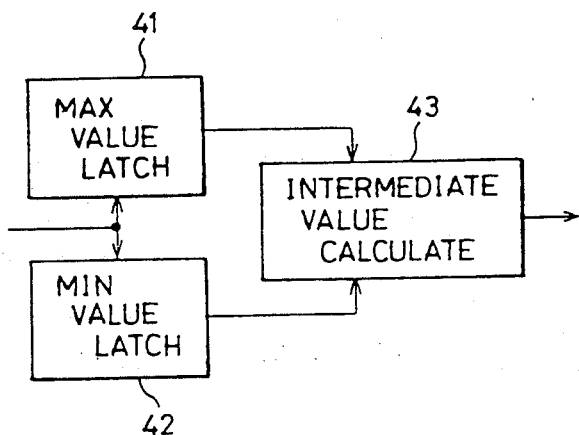
FIG. 7 is a block diagram showing in detail an intermediate value setting circuit of FIG. 6.

FIG. 7 is a block diagram showing in detail the intermediate value setting circuit 33. Referring to FIG. 7, the counted value data provided from horizontal counting circuit 30 is applied to a maximum value latching circuit 41 and a minimum value latching circuit 42. These latching circuits latch the maximum value and the minimum value of the counted value data, respectively, in the horizontal direction for each block. The counted value data for one frame is applied, and the maximum and minimum values of counted value data $V_1$ are averaged for each block by intermediate value calculating circuit 43 during the vertical blanking period after the maximum value and the minimum value for each block have been determined. Thus, the intermediate value data of the vertical direction is calculated.

This intermediate value data is supplied and stored in the first intermediate value memory circuit 35 of the next stage. At the next frame, the intermediate value data of the block corresponding to the latest counted value data $V_1$ provided from horizontal counting circuit 30 is read out from the first intermediate value memory circuit 35. Horizontal normalization circuit 37 compares the latest counted value data $V_1$ provided from horizontal counting circuit 30 with the intermediate value data provided from the first intermediate value memory circuit 35 to provide the comparison result to memory 39 as the horizontal normalized data of 1 or 0.

Vertical counting circuit 31 for integrating binary coded data in the vertical direction integrates the counted value data read out from M line memory 32 that stores the counted values in the vertical direction for all blocks forming one frame and the latest binary coded data provided from comparison circuit 4 to sequentially update the counted value of the corresponding vertical line, whereby the integrated data is stored in M line memory 32, and supplied to the second intermediate value setting circuit 34 and a vertical normalization circuit 38.

The structure and operation of the second intermediate value setting circuit 34 are basically similar to that of the first intermediate value setting circuit 33 of FIG. 7. However, the second intermediate value setting circuit 34 has a simpler circuit configuration because it is not necessary to provide memory means for each block in maximum value latching circuit 41 and minimum value latching circuit 42 due to counted value being sequentially provided from vertical counting circuit 31 for each block.

The vertical intermediate value data calculated at the second intermediate value setting circuit 34 is provided to the second intermediate value memory circuit of the next stage. In the next frame, intermediate value data of the block corresponding to the latest counted value data $H_1$ provided from vertical counting circuit 31 is read out from the second intermediate value memory circuit 36. Vertical normalization circuit 38 compares the latest counted value data $H_1$ provided from vertical counting circuit 31 with the intermediate value data provided from the second intermediate value memory circuit 36 to supply the comparison result to memory 39 as the vertical normalized data of "1" or "0". The above mentioned horizontal counting circuit 30, vertical counting circuit 31, M line memory 32, first and second intermediate value setting circuits 33 and 34, first and second intermediate value memory circuits 35 and 36, horizontal normalization circuit 37 and vertical normalization circuit 38 constitute as-a whole a normalization circuit 100.

Memory 39 stores the horizontal normalized data provided from horizontal normalization circuit 37 in a vertical memory (not shown), and the vertical normalized data provided from vertical normalization circuit 38 in a horizontal memory (not shown). After one frame period has elapsed, memory 39 transmits this content to memory 40.

The contents of memories 39 and 40 are read out simultaneously and provided to microcomputer 7 identical to that of the first embodiment of FIG. 2. The motion vector for each block is specified according to the normalized horizontal and vertical distribution detected data, and then the motion vector representing the entire picture is specified by the majority decision logic process. The remaining operation is identical to that of the aforementioned first embodiment and will not be repeated.

Thus, in accordance with the second embodiment of the present invention, the movement of an object in an effective image area can be detected by carrying out normalization process that integrates and binary-codes the pattern of high level portion of the object, even when the binary coded data of an object image are dispersed.

Figure 8:
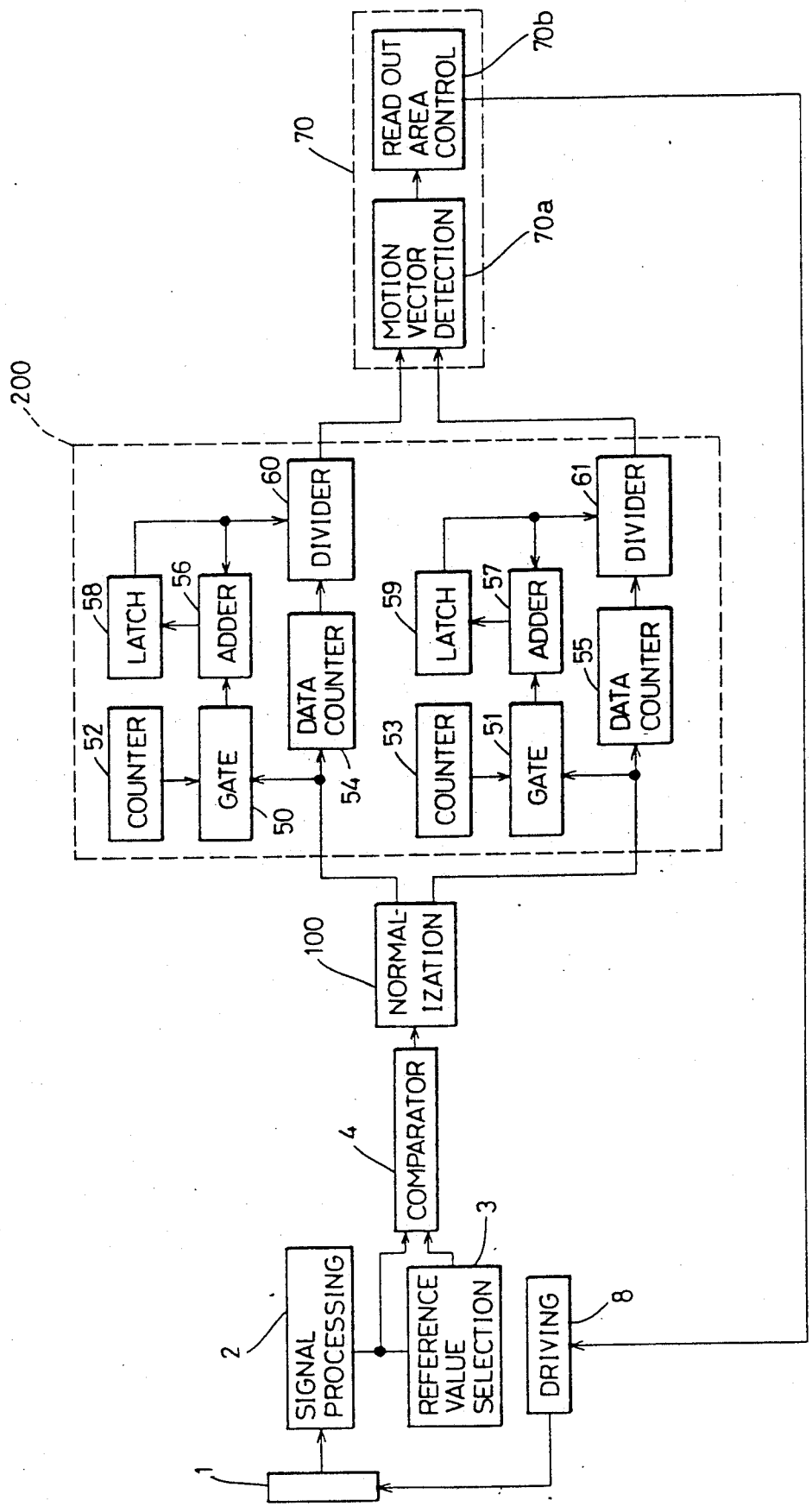
FIG. 8 is a block diagram schematically showing a camera-shake detecting circuit of a video camera according to a third embodiment of the present invention.

FIG. 8 is a block diagram schematically showing a camera-shake detecting circuit of a video camera according to a third embodiment of the present invention. In the third embodiment, the center point of the object pattern for each block is detected according to the horizontal and vertical normalized data for each block calculated by the normalization circuit 100 of the aforementioned second embodiment. The motion vector for each block is specified according to the moving direction of the center point of each block between consecutive frames.

Referring to FIG. 8, horizontal normalized data and vertical normalized data separately provided from normalization circuit 100 having a structure identical to that of FIG. 6 are provided to a center point detecting circuit 200 sequentially for each block to detect the position of center point G of the object pattern for each block.

Center point G is individually obtained for the vertical direction and the horizontal direction by the following equation, where N is the bit number of the horizontal or vertical normalized data, and $D_k$ is the data of the K-th bit within this data.

$$G = \sum_{k=1}^{N} k \times D_k / \sum_{k=1}^{N} D_k \quad (1)$$

Referring to FIG. 8, the horizontal normalized data (vertical direction center point position data) supplied from normalization circuit 100 is provided to the control input of a gate 50 and a data counter 54. Counter 52 repeats counting for each block, i.e. for every P bits in synchronism with the input of the first bit of the horizontal normalized data of each block. When the k-th bit data $D_k$ of the horizontal normalized data is "1", gate 50 supplies the counted value k of counter 52 to one input of an adder circuit 56. The output of adder circuit 56 is latched at a latching circuit 58, and then applied to the other input of adder circuit 56. That is to say, latching circuit 58 and adder circuit 56 carry out the calculation of the numerator of equation (1) obtaining the position of a center point in the vertical direction, $$\text{i.e. } \sum_{k=1}^{N} k \times D_k.$$

This calculated result is stored in latching circuit 58.

Data counter 54 counts the applied horizontal normalized data to carry out the calculation of the denominator of equation (1) for the vertical direction, $$\text{i.e. } \sum_{k=1}^{N} D_k.$$

After the horizontal normalized data of each block have been applied, a divider circuit 60 divides the output of latching circuit 58 by the output of data counter 54 to obtain the center point position data in the vertical direction of the corresponding block.

Similarly, the vertical normalized data (horizontal center point position data) provided from normalization circuit 100 is applied to the control input of a gate 51 and a data counter 55. A counter 53 repeats counting for each block, i.e. for every Q bits in synchronism with the input of the first bit of the vertical normalized data of each block. When the k-th data $D_k$ of the vertical normalized data is "1", gate 51 supplies the counted value k of counter 53 to one input of an adder circuit 57. The output of adder circuit 57 is latched at a latching circuit 59, and then supplied to the other input of adder circuit 57. That is to say, latching circuit 59 and adder circuit 57 carry out the calculation of the numerator of equation (1) obtaining the position of the center point in the horizontal direction, $$\text{i.e. } \sum_{k=1}^{N} \times D_k.$$

. The calculated result is stored in latching circuit 59.

Data counter 55 counts the applied vertical normalized data to carry out calculation of the denominator of equation (1) of the horizontal direction, $$\text{i.e. } \sum_{k=1}^{N} D_k.$$

. After the horizontal normalized data have been applied for each block, a divider circuit 61 divides the output of latching circuit 59 by the output of data counter 55 to obtain the center point position data in the horizontal direction of the corresponding block.

The center point position data of the vertical direction and the horizontal direction calculated in center point detecting circuit 200 are applied to the two input terminals of microcomputer 70. Microcomputer 70 specifies the motion vector of the object in the effective image area according to the center point position data provided from center point detecting circuit 200 to move the effective image area appropriately within the image sensing area in a software manner according to the result. Microcomputer 70 functions as a combination of motion vector detecting circuit 70a and read out area control circuit 70b.

Figure 9:
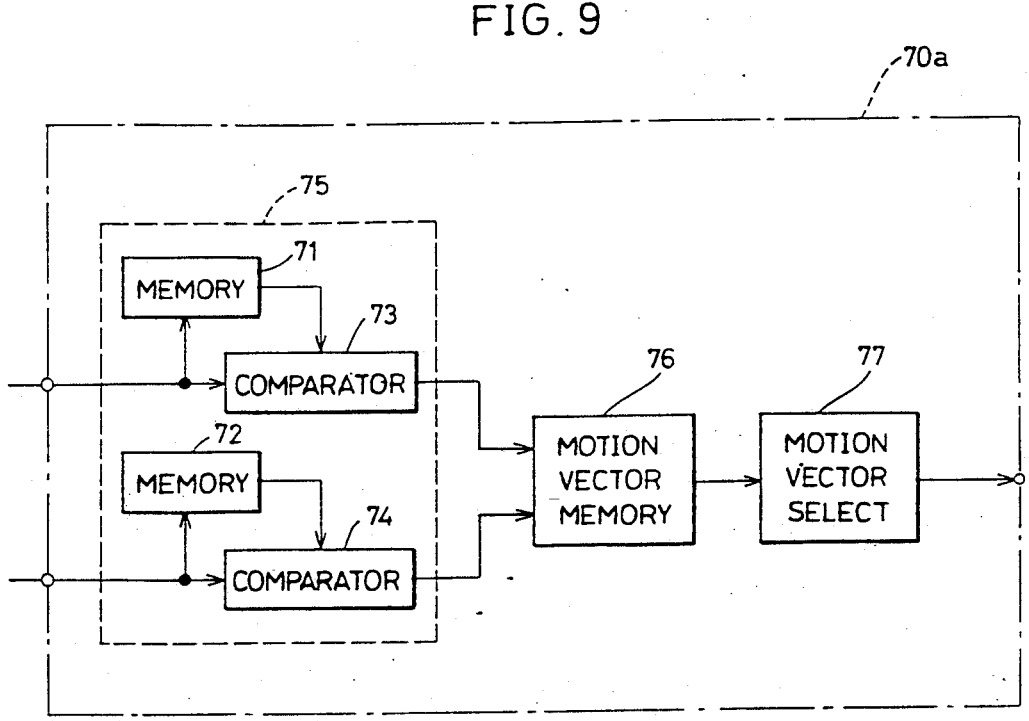
FIG. 9 is a block diagram showing in detail a motion vector detecting circuit of FIG. 8.

FIG. 9 is a block diagram showing the function of motion vector detecting circuit 70a. Referring to FIG. 9, the center point position data of the vertical direction provided from center point detecting circuit 200 is applied to a memory 71 and a comparison circuit 73, whereby the center point position data of all the blocks of the corresponding frame are temporarily held in memory 71. At the next frame, the latest vertical direction center point position data provided from center point detecting circuit 200 is compared with the vertical direction center point position data of the preceding frame provided from memory 71 for each block to calculate the difference therebetween, i.e. the moving distance of the center point of the object pattern in the vertical direction in one frame period.

Similarly, the horizontal direction center point position data provided from center point detecting circuit 200 is applied to a memory 72 and a comparison circuit 74, whereby the center point position data of all the blocks of the corresponding frame are temporarily held in memory 72. At the next frame, the latest horizontal direction center point position data of the preceding frame provided from center point detecting circuit 200 is compared with the horizontal direction center point position data of the preceding frame provided from memory 72 for each block to calculate the difference therebetween, i.e. the moving distance of the center point of the object pattern in the horizontal direction in one frame period.

The above mentioned memories 71 and 72 and comparison circuits 73 and 74 form motion vector specifying circuit 75.

The moving distances of the center point in the vertical direction and the horizontal direction for each block is sequentially stored in motion vector memory 76. The motion vectors for respective blocks are established within motion vector memory 76.

The motion vectors of respective blocks established in memory 76 are read out sequentially and provided to motion vector selection circuit 77 for majority decision logic process. Similar to the motion vector selection circuit 24 of FIG. 4, motion vector selection circuit 77 selects the motion vector of the most highest frequency occurrence out of the motion vectors of respective blocks and provides the same to read out area control circuit 70b of FIG. 8 as the motion vector representing the movement of the object in the entire picture. Because read out area control circuit 70b is identical to read out area control circuit 7b of FIG. 2, the remaining operation is identical to that of the aforementioned first and second embodiments, and their description will not be repeated.

Although majority decision logic process is carried out for the motion vectors specified for all blocks in the above mentioned third embodiment, the motion vector for the entire image area may be specified by individually carrying out majority decision logic process for the scalar quantity of the moving distances of the center point position in the vertical direction and the horizontal direction.

The above mentioned third embodiment detects the center point position according to the normalized data of all horizontal lines and vertical lines in each block. There is a great possibility that a new object is introduced near the inner periphery of the boundary of each block when camera-shaking caused by the operator occurs. Therefore, such normalized data of the lines near the inner periphery of the succeeding frame may suppress the accurate detection of the center point position.

Figure 10:
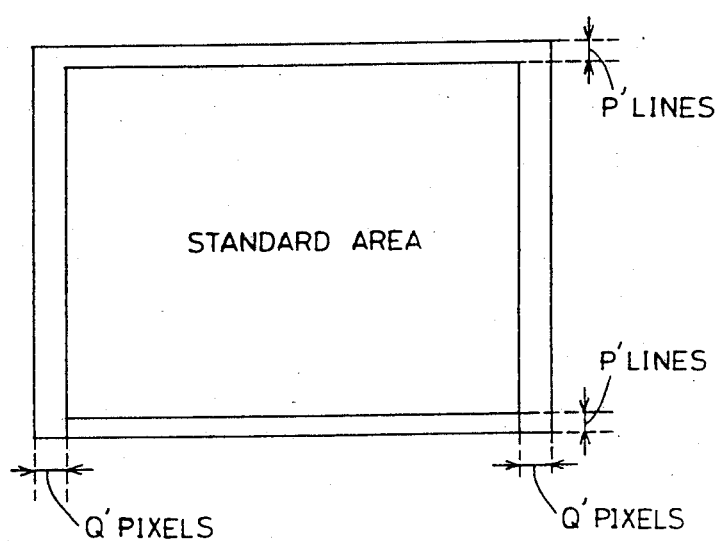
FIG. 10 schematically shows a manner in which an area is set according to a still further embodiment of the present invention.

When the maximum moving distances of the object due to camera-shaking are expected to be $\pm Q'$ pixels in the horizontal direction and $\pm P'$ lines in the vertical direction, it is possible to calculate the center point position data of the preceding frame which is the base for comparison, using the area inside FIG. 10 as the standard area for each block of the preceding frame, and then use the center point data of $(2Q'+1)\times(2P'+1)$ areas (the outside area of FIG. 10) formed by moving the above mentioned standard area $\pm Q'$ pixels in the horizontal direction and $\pm P'$ lines in the vertical direction as the center point position data of the current frame to be compared.

It is also applicable to the first and second embodiments to detect the movement of the object by setting the area in each block in the preceding frame to be smaller than the area in each block in the current frame.

Hence, according to third embodiment of the present invention, unnecessary movement of an object due to camera-shaking can be detected with a more simplified structure.

Although a method of moving an effective image area within the image sensed area is employed as a method of correction according to the detected motion vector in the above described three embodiments, other methods for correction may be employed, such as changing the angles of the CCDs or lens.

It is appreciated that a portion or all of the first to third embodiments may be realized in a software manner using microcomputers.

It is also appreciated that a similar effect may be obtained by specifying a motion vector by directly carrying out the center point detection of the third embodiment according to distribution detected data obtained for each vertical line memory and each horizontal line memory in the first embodiment, without carrying out the normalization process of the second embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image sensing apparatus having camera-shake detection function comprising:
   image sensing means for receiving light from an object and converting the same into a video signal,
   binary coding means for dividing an image sensed picture into a plurality of blocks and binary coding said video signal at a plurality of sampling points in each block by comparing the same with a first reference value determined for each block,
   distribution data calculating means for calculating data representing the distribution position of the object in the vertical direction and the horizontal direction in each block according to said binary coded data for each block,
   motion vector specifying means for specifying a motion vector of the object for each block according to said data representing the distribution position of the object, and
   motion vector selecting means for selecting a motion vector of the object of an entire image sensed picture by logic process based on said specified motion vectors for respective blocks.

2. The image sensing apparatus according to claim 1, wherein said distribution data calculating means comprises
   means detecting the presence of a specified binary coded data in each horizontal line of each block for generating a first data indicating the distribution position of the object in the vertical direction, and
   means detecting the presence of a specific binary coded data in each vertical line of each block for generating a second data indicating the distribution position of the object in the horizontal direction.

3. The image sensing apparatus according to claim 2, wherein
   said distribution data calculating means comprises means for calculating data indicating the center point position of the object in each block according to said first and second data,
   said motion vector specifying means comprises means to detect the moving distance of the center point of said object between the preceding frame and the current frame in each of said block for specifying a motion vector for each block according to the result.

4. The image sensing apparatus according to claim 1, wherein said distribution data calculating means comprises
   means for generating a first normalized data by integrating said binary coded data in each horizontal line of each block and comparing the result with a second reference value determined for each block, and
   means for generating a second normalized data by integrating said binary coded data in each vertical line of each block and comparing the result with a third reference value determined for each block.

5. The image sensing apparatus according to claim 4, wherein said motion vector specifying means comprises means to detect a change in said first and second normalized data between the preceding frame and the current frame for specifying a motion vector for each block according to the result.

6. The image sensing apparatus according to claim 4, wherein
   said distribution data calculating means comprises means for calculating data indicating the center point position of the object for each block according to said first and second normalized data,
said motion vector specifying means comprises means to detect the moving distance of the center point of the object between the preceding frame and the current frame for each of said block for specifying a motion vector for each block according to the result.

* * * * *